J. N. JONES.
Picker-Lag.
No. 224,545. Patented Feb. 17, 1880.
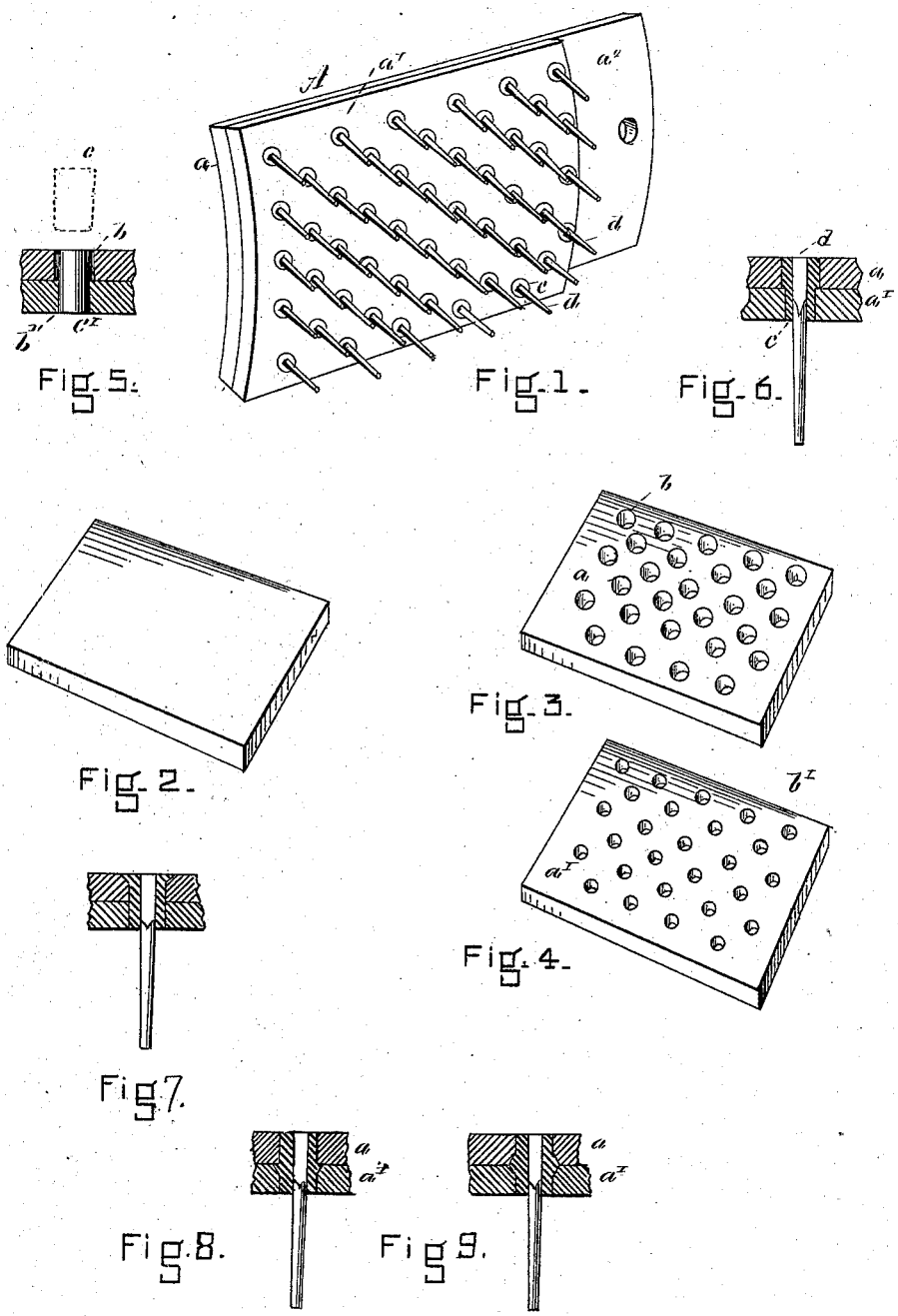
WITNESSES INVENTOR

UNITED STATES PATENT OFFICE.

JOSIAH N. JONES, OF WORCESTER, ASSIGNOR OF ONE-HALF OF HIS RIGHT TO F. F. RAYMOND, 2D, OF NEWTON, MASSACHUSETTS.

PICKER-LAG.

SPECIFICATION forming part of Letters Patent No. 224,545, dated February 17, 1880.

Application filed December 24, 1878.

*To all whom it may concern:*

Be it known that I, JOSIAH N. JONES, of Worcester, in the Commonwealth of Massachusetts, have invented an Improvement in Picker-Lags, of which the following is a specification.

This invention has for its object the within-described improvement in the construction of picker-lags for shoddy-machines, &c.

Heretofore picker-lags have generally been made of wood having perforations through which headed teeth are driven, though in some instances a plate of iron has been employed in lieu of the wood, and the teeth have been secured in holes drilled therein by soft metal. A wooden lag is objectionable, in that it is liable to shrink, crack, or split on the line of the teeth, and because the teeth cannot be driven as near the edge of the lag as is necessary to make a continuous line of teeth when the lags are secured to the cylinder. A space without teeth occurs between each lag, so that much of the area of the cylinder is not utilized, and unpicked material is liable to pass through the machine. The teeth, which are fastened in metal lags by soft metal, work loose principally because the soft-metal bushing is not sufficiently elastic. Another objection to this construction of metal lag is that the heating of the plate to remove and renew a broken tooth oftentimes loosens the other teeth.

It is very desirable, however, to use a metal support for holding the teeth, and I have discovered that, by providing the support with holes into which wood or some other suitable material is compressed to serve as a bushing for the teeth, they are securely fastened to the metal support, and that one broken or worn out can readily be removed and a new bushing and tooth inserted without disturbing those adjacent. A metal support is also desirable, because the teeth can be inserted so close to the edge of each lag that no break occurs in the picking-surface of the cylinder.

I have ascertained that the best construction of lag is that obtained by using superposed thin plates, which together shall be of the requisite thickness for strength, first, because the holes into which the bushings are inserted can be easily formed and the necessary shoulder provided; and, second, because the plates, after the holes have been punched, can be bent, without heating, to the desired curvature. It is necessary, however, in order to properly secure the bushing in the hole, that there be an enlargement or shoulder in each to prevent the pin and bushing from being thrown outwardly by centrifugal force. This enlargement or shoulder can be formed in a variety of ways. For instance, the holes in the inner plate may be made somewhat larger than the corresponding holes in the outer plate, and in this regard I desire to state that if the inner plate is first punched it may be used as a templet, in connection with the punching-machine, for the purpose of making the holes in the outer plate. The shoulder is thus formed at the center of the length of each hole by making the hole in one plate smaller than the hole in the other.

Another modification in the construction whereby a shoulder is obtainable is secured by countersinking the holes upon the inner surface of the inner plate, as in Fig. 7, or upon the inner surface of the outer plate, as in Fig. 8, or upon the outer surface of the inner plate, or upon both the outer surface of the inner plate and the inner surface of the outer plate, as in Fig. 9. In this last-mentioned case the hole would be of uniform diameter at each end, would be enlarged at the center, and the shoulder would thus be formed by the enlargement of the hole.

The holes may be cylindrical or square, and may have a very slight taper upon some portion of their length. The bushing should correspond in shape to the hole which it is designed it shall fill, but should have a somewhat greater diameter than the diameter of the hole before it is forced therein, and preferably should taper somewhat, particularly upon the end first inserted. Each tooth has a shank which tapers very slightly from the head.

In the drawings, Figure 1 represents a perspective of a portion of the picker-lag, showing my invention. Fig. 2 is a perspective of an uncurved plate. Fig. 3 represents a perspective of a perforated inner plate. Fig. 4 represents a perspective of the perforated outer plate. Figs. 5 and 6 are detail views. Figs.

7, 8, and 9 represent modifications in construction.

A represents a metal support, composed of the inner plate, $a$, in which the larger holes $b$ are formed, and the outer plate, $a'$, in which the smaller holes $b'$ are formed. The wooden bushing before insertion is represented in dotted outline at $c$, and after it has been driven at $c'$. A tooth, $d$, having a square shank, is shown in Fig. 6, and the bushing, as compressed and wedged by the driving of a tooth through it, is also shown in cross-section in the same figure.

Although I may use teeth provided with heads and shanks, substantially as shown in Patent No. 209,376, granted Belser & Beals, October 29, 1878, yet I prefer the construction herein set forth, as the sides of the shank are more nearly parallel with the sides of the hole, and as the bushing is so wedged that it cannot be displaced. The teeth with slight taper are not nearly so liable to be loosened as teeth having a considerable taper, for the tooth with a tapering shank, if "started" in its bushing, immediately becomes loose; whereas, if the shank does not taper to any extent, there is such a continuous bearing that the mere starting of the tooth does not loosen the hold of the bushing upon it. The plates comprising the metal support may be riveted together, and one plate may project sufficiently to form a shoulder, upon and through which the pin or bolts which unite the lags to the cylinder may bear or pass.

In lieu of wooden bushings, papier-maché, rubber or any of its compounds, or any suitable compressible material may be used.

A modification of this invention is secured by the use of a thick plate in lieu of the thin ones, in which case the holes are drilled instead of punched, and the shoulders are not so readily formed.

Having thus fully described my invention, I claim and desire to secure by Letters Patent of the United States—

1. A picker-lag consisting of a perforated metal support, suitable bushings compressed within the perforations, and metallic pins driven through said bushings, all substantially as described.

2. In a picker-lag, the combination of a metallic support provided with perforations having a shoulder or enlargement between the two surfaces of the support, a bushing of wood or other suitable material compressed within said perforations, and metallic pins driven through said bushings, all substantially as and for the purposes described.

JOSIAH N. JONES.

Witnesses:
F. F. RAYMOND, 2d,
GEO. F. WALKER.